US011168674B2

(12) United States Patent
Zhang et al.

(10) Patent No.: US 11,168,674 B2
(45) Date of Patent: Nov. 9, 2021

(54) WAVE ENERGY THERMAL STORAGE TYPE SEAWATER THERMOELECTRIC POWER GENERATION DEVICE

(71) Applicant: DALIAN UNIVERSITY OF TECHNOLOGY, Liaoning (CN)

(72) Inventors: Chongwei Zhang, Liaoning (CN); Qianze Zhuang, Liaoning (CN); Dezhi Ning, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/980,331

(22) PCT Filed: Oct. 11, 2019

(86) PCT No.: PCT/CN2019/110586
§ 371 (c)(1),
(2) Date: Sep. 11, 2020

(87) PCT Pub. No.: WO2021/068190
PCT Pub. Date: Apr. 15, 2021

(65) Prior Publication Data
US 2021/0190045 A1  Jun. 24, 2021

(51) Int. Cl.
*F03G 7/05* (2006.01)
*B63B 35/44* (2006.01)
(Continued)

(52) U.S. Cl.
CPC .............. *F03G 7/05* (2013.01); *B63B 35/44* (2013.01); *F03B 13/16* (2013.01); *H02K 7/02* (2013.01);
(Continued)

(58) Field of Classification Search
CPC ............ F03G 7/05; B63B 35/44; B63B 21/20; B63B 2021/203; B63B 2035/4466;
(Continued)

(56) References Cited

U.S. PATENT DOCUMENTS 3,487,228 A * 12/1969 Bernard ................ F03B 13/187
290/52
2003/0110767 A1 * 6/2003 Lee ..................... F03B 13/1815
60/495

(Continued)

FOREIGN PATENT DOCUMENTS

CN         2099205 U      3/1992
CN       101769224 A      7/2010
(Continued)

*Primary Examiner* — Shafiq Mian
(74) *Attorney, Agent, or Firm* — Muncy, Geissler, Olds & Lowe, P.C.

(57) ABSTRACT

A wave energy thermal storage type seawater thermoelectric power generation device which comprises a buoy-type energy capture system, a platform system and a mooring system. A whole friction liquid heating, thermal storage and power generation device is arranged inside a platform, which improves the adaptability of the whole system to the external environment. A flywheel and liquid friction heating method is adopted to generate heat more efficiently. Inner ratchets and pawls are used to control the movement of a flywheel so that the flywheel always rotates in one direction, and when the rotating speed of the flywheel exceeds that of the inner ratchets, the external wave energy cannot be transferred to the flywheel through the movement of the inner ratchets so as to limit the upper limit of the rotating speed of the flywheel and protect the safety of the flywheel system.

8 Claims, 2 Drawing Sheets

(51) Int. Cl.
*F03B 13/16* (2006.01)
*H02K 7/02* (2006.01)
*H02K 7/07* (2006.01)
*H02K 7/18* (2006.01)
*B63B 21/20* (2006.01)

(52) U.S. Cl.
CPC ............ *H02K 7/07* (2013.01); *H02K 7/1823* (2013.01); *B63B 21/20* (2013.01); *B63B 2021/203* (2013.01); *B63B 2035/4466* (2013.01); *F05B 2220/706* (2013.01); *F05B 2240/95* (2013.01)

(58) Field of Classification Search
CPC ............ F05B 2220/706; F05B 2240/95; F03B 13/16; H02K 7/02; H02K 7/07; H02K 7/182308; H02K 27/2021
See application file for complete search history.

(56) References Cited

U.S. PATENT DOCUMENTS

| | | | |
|---|---|---|---|
| 2005/0084333 A1* | 4/2005 | Zadig | F04B 17/00 405/79 |
| 2008/0295510 A1* | 12/2008 | Vukovic | F03B 13/1815 60/505 |
| 2010/0045044 A1* | 2/2010 | Patterson | F03B 13/1865 290/53 |

FOREIGN PATENT DOCUMENTS

| | | |
|---|---|---|
| CN | 102155349 A | 8/2011 |
| CN | 202971047 U | 6/2013 |
| CN | 204663783 U | 9/2015 |
| KR | 10-1452689 B1 | 10/2014 |

\* cited by examiner

WAVE ENERGY THERMAL STORAGE TYPE SEAWATER THERMOELECTRIC POWER GENERATION DEVICE

TECHNICAL FIELD

The present invention belongs to the technical field of utilization of ocean energy, and particularly relates to an ocean wave energy and ocean thermoelectric power generation device.

BACKGROUND

The energy demand in the world is increasing day by day, and fossil fuels are gradually depleted. The full development of renewable energy will help mankind break through the current energy crisis. Among various forms of renewable energy, ocean energy has huge reserves and is widely distributed, with great development potential. Wave energy with the reserves of 2.5 billion kW and thermoelectric energy with the reserves of 2 billion kW are the two most important forms of ocean energy.

The existing wave energy conversion technologies (such as oscillating-buoy type, raft type, Salter's duck type and oscillating water column type) usually require multi-step energy conversion, first converting wave energy to mechanical energy and then converting the mechanical energy to electrical energy. Due to the characteristic of randomness of waves of the actual sea state, the mechanical energy and electrical energy signals obtained by conversion are not stable, thus requiring additional design of a rectifying device, which leads to problems such as low wave energy utilization efficiency and high construction cost.

The ocean thermoelectric energy technology mainly uses the temperature difference between the warm surface seawater and the cold deep seawater to generate power. The power generation process is relatively stable, but an additional pump is required to extract the warm seawater and the cold seawater. Therefore, the energy consumption of the device is huge, the net electric generation and the benefit are limited.

SUMMARY

The present invention aims to combine two ocean energy utilization technologies of wave energy and thermoelectric energy, integrate the advantages thereof and overcome the respective shortcomings to obtain better power generation effects.

The technical solution of the present invention is:

A wave energy thermal storage type seawater thermoelectric power generation device, comprises a buoy-type energy capture system, a platform system and a mooring system.

The platform system comprises three parts which are respectively a hot water tank 12, a generator room 19 and a cooling room from top to bottom, wherein the hot water tank 12 is wrapped with a thermal insulation layer 11 and filled with liquid required for heating; a flywheel rotor shaft 1 is arranged in the center of the hot water tank 12, the lower part of the flywheel rotor shaft 1 is in contact with the bottom surface of the hot water tank 12, a flywheel 13 is fixed by bearings 8 in the middle of the flywheel rotor shaft 1, and the upper part extends out of the hot water tank 12 and above the platform 22; the flywheel rotor shaft 1 is fixed by bearings 8 on faying surfaces; the flywheel rotor shaft 1 above the platform 22 is sheathed with a plurality of rotary sleeves 2, each rotary sleeve 2 has an inner ratchet 29 and a pawl 28 inside, the inner ratchet 29 is fixedly connected to the inner wall of the rotary sleeve 2 and is not in contact with the flywheel rotor shaft 1, the pawl 28 is fixed on a disc fixedly connected to the flywheel rotor shaft 1, and a needle roller bearing is arranged between the disc and the inner wall of the rotary sleeve; a wirerope 7 is wound around the outer wall of the rotary sleeve 2, one end of the wirerope 7 is connected to the buoy-type energy capture system, and the other end is connected to a preloaded spring 3 which is connected to a fixed bar 5 through a ring 4; a heat collecting pipe 9 is wound around the inner wall of the hot water tank 12, and has gas working fluid inside; the left and right ends of the heat collecting pipe 9 extend upwards away from the hot water tank 12 and the upper surface of the thermal insulation layer 11, and then extend downwards along the outer wall of the thermal insulation layer 11 into the generator room 19; the generator room 19 comprises at least one turbogenerator 20 and a working fluid pump 21, and the turbogenerator at least one 20 has a cable 10 extending above the platform 22 for connection with other electrical equipment; both ends of the heat collecting pipe 9 respectively pass through each of the at least one turbogenerators 20 in the generator room 19, continue to extend downwards, and finally communicate with a cooling pipe 24 in the sea; the main body of the cooling pipe 24 is a spiral descent pipe with liquid working fluid inside; and a water permeable net 25 connected to the bottom surface of the platform 22 is covered outside the whole cooling pipe 24, and the water permeable net 25 and the cooling pipe 24 form the cooling room of the platform system;

The mooring system comprises mooring points 23, mooring lines 26 and anchors 27, wherein the mooring points 23 are at the bottoms of both sides of the platform 22, and the mooring lines 26 are connected to the platform 22 through the mooring points 23 and are fixed on the seabed with the aid of the anchors 27;

The buoy-type energy capture system comprises two parts: buoys 18 and motion transfer components, wherein the motion transfer components comprise guide rail rooms 15, pulley rooms 16, guide pulleys 14, fixed pulleys 17, platform pulleys 6 and wireropes 7; a plurality of buoys 18 uniformly surround the platform 22, one side of each buoy 18 close to the platform 22 is connected to the guide rail room 15 through the guide pulleys 14, the pulley room 16 is arranged between the guide rail room 15 and the platform 22, and the pulley room 16 has a pulley block composed of four fixed pulleys 17 inside; and one end of the wirerope 7 is bound with the guide pulleys 14, and the other end starts from the guide rail room 15 and passes the pulley block of the pulley room 16 and the platform pulley 6 fixed on the platform 22 to be finally connected with the rotary sleeve 2.

During working, the buoys 18 move up and down under the drive of waves and drive the wireropes 7 to move; when the buoys 18 move upwards, because the wireropes 7 is bound with the guide pulleys 14, the wireropes 7 of the guide rail rooms 15 move upwards at the same time, and the wireropes 7 located in the pulley rooms 16 change from moving upwards to moving downwards due to the action of the fixed pulleys 17; under the action of the platform pulleys 6, the wireropes 7 above the platform 22 moves horizontally towards the left to drive the rotary sleeves 2 to rotate clockwise; at this time, the preloaded springs 3 are stretched, and part of the wave energy is converted to elastic potential energy; the inner ratchets 29 rotate together with the rotary sleeves 2 but cannot drive the flywheel rotor shafts 1 to rotate due to the action of the pawls 28; when the buoys 18 move downwards, the wireropes 7 are wound back to the rotary sleeves 2 counterclockwise in the tightened state due to the action of the preloaded springs 3; at this time, the pawls 28 no longer hinder the rotation of the flywheel rotor shafts 1, and the flywheel 13 rotates consequently under stress; the rotating flywheel 13 constantly rubs against the liquid filled in the hot water tank 12 to heat the liquid, thereby achieving the purpose of wave energy thermal storage; the thermal insulation layer 11 ensures that the hot water tank 12 does not conduct heat exchange with the outside as much as possible; due to direct contact between the heat collecting pipe 9 and the hot liquid, the heat generated by the friction between the flywheel 13 and the liquid can be transferred into the heat collecting pipe 9 with relatively high efficiency, the liquid working fluid in the heat collecting pipe 9 immediately boils and evaporates into gas, and the volume expands rapidly; since liquid continuously enters on the side with the working fluid pump 21, the gas moves quickly to the side with the at least one turbogenerator 20; the high-speed gas working fluid drives each of the at least one turbogenerators 20 to generate power when passing, and the current is transmitted to other electrical equipment through the cable 10; after entering the cooling pipe 24, the gas working fluid is condensed into liquid at an appropriate seawater temperature; and the liquid working fluid 21 is pumped back to the heat collecting pipe 9 by the working fluid pump 21, and converted to gas by heat for cycle power generation;

The outer wall of the heat collecting pipe 9 is covered with the thermal insulation layer to ensure that the temperature in the heat collecting pipe 9 is kept constant as possible.

The pipe walls of the heat collecting pipe 9 and the cooling pipe 24 are made of metal with fast heat transfer.

The surfaces of the platform 22, the buoys 18, the wireropes 7 and the water permeable net 25 are all treated to extend the service life thereof.

The outer surface of the flywheel 13 is made of a rough sandy material to improve the efficiency of heat generation by friction.

The present invention has the following beneficial effects:

(1) The random wave energy is converted to stable thermal energy, and the movement of the gas working fluid is used to achieve the effect of slowly releasing thermal energy so that each of the at least one turbogenerators can work stably.

(2) With the flywheel energy storage structure, the fast-rotating flywheel has the gyroscopic effect, which increases the stability and safety of the platform.

(3) The whole friction liquid heating, thermal storage and power generation device is arranged inside the platform, which improves the adaptability of the whole system to the external environment.

(4) The flywheel and liquid friction heating method is adopted to generate heat more efficiently.

(5) The inner ratchet and the pawl are used to control the movement of the flywheel so that the flywheel always rotates in one direction, and when the rotating speed of the flywheel exceeds that of the inner ratchet, the external wave energy cannot be transferred to the flywheel through the movement of the inner ratchet so as to limit the upper limit of the rotating speed of the flywheel and protect the safety of the flywheel system.

(6) The plurality of buoys respectively input the energy into the flywheel through the respective inner ratchets, and the buoys are arranged in a 360-degree uniform surrounding manner, which can adapt to the conditions of different wave directions and random wave components in the sea.

(7) The heat collecting pipe is in direct contact with hot liquid to achieve efficient heat transfer.

(8) The spiral cooling pipe ensures that the working liquid in the pipe can conduct heat exchange with seawater fully and efficiently.

(9) The water permeable net protects the safety of the cooling pipe, and cold sea water can circulate freely around the cooling pipe.

(10) Compared with the traditional ocean thermoelectric power generation device, the present invention saves the energy for extracting deep cold sea water.

Figure 1:
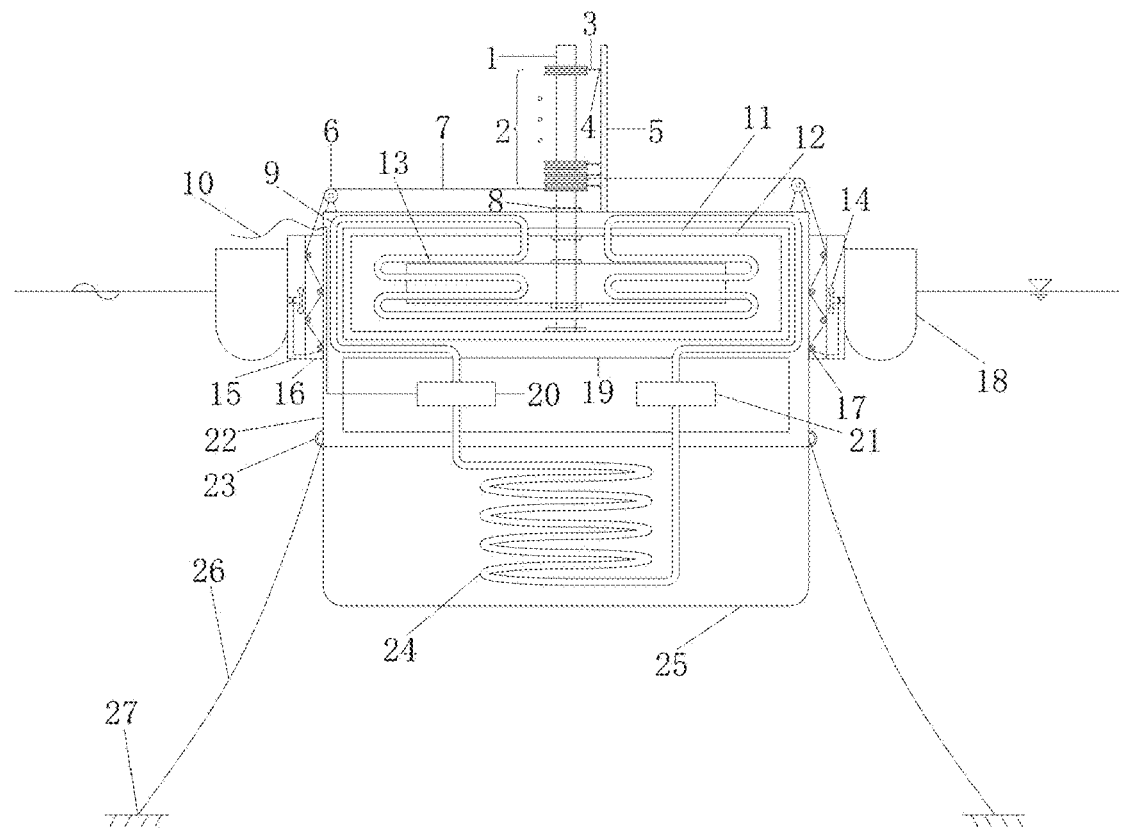
FIG. 1 is an overall sectional structural diagram of the wave energy thermal storage type seawater thermoelectric power generation device.
Figure 2:
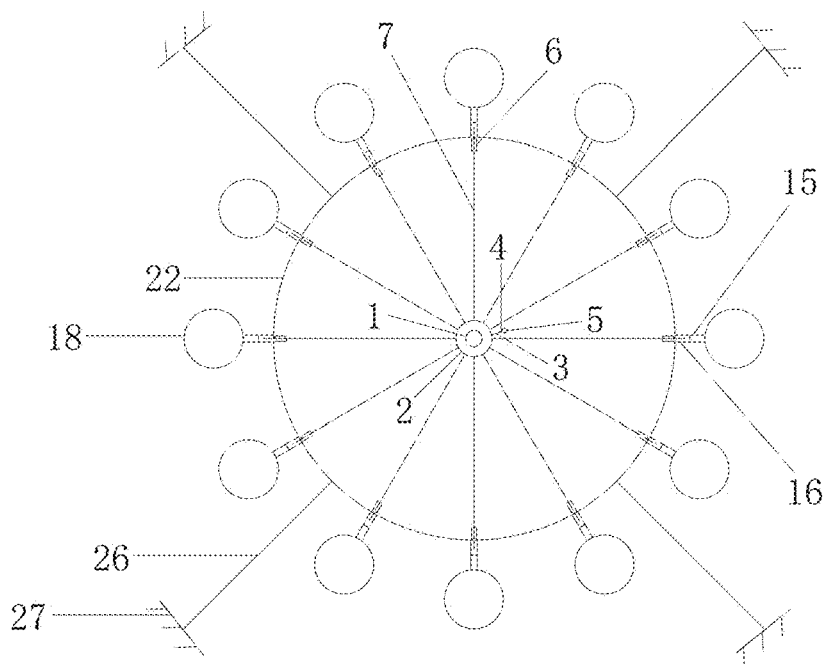
FIG. 2 is an overall top view of the device.
Figure 3:
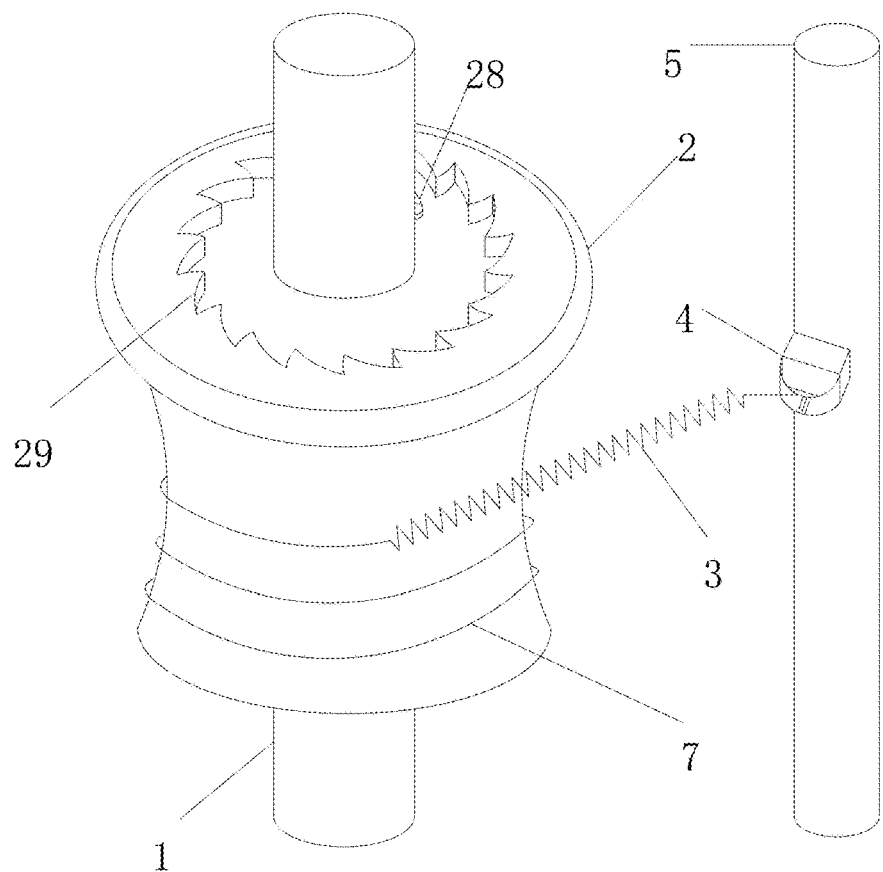
FIG. 3 is a stereogram of the structure of the rotary sleeve and the fixed bar.
Figure 4:
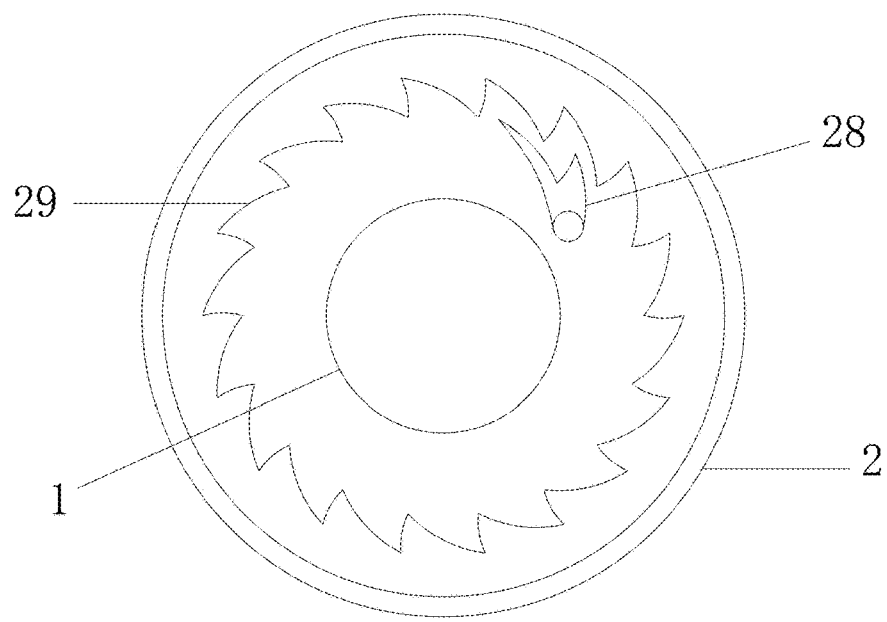
FIG. 4 is a top view of the structure of the rotary sleeve.

In the figures, 1 flywheel rotor shaft; 2 rotary sleeve (12 in total); 3 preloaded spring; 4 ring; 5 fixed bar; 6 platform pulley; 7 wirerope; 8 bearing; 9 heat collecting pipe; 10 cable; 11 thermal insulation layer; 12 hot water tank; 13 flywheel; 14 guide pulley; 15 guide rail room; 16 pulley room; 17 fixed pulley; 18 buoy; 19 generator room; 20 turbogenerator; 21 working fluid pump; 22 platform; 23 mooring point; 24 cooling pipe; 25 water permeable net; 26 mooring line; 27 anchor; 28 pawl; 29 inner ratchet.

DETAILED DESCRIPTION

The present invention is further described below in detail in combination with the drawings and a specific embodiment.

A wave energy thermal storage type seawater thermoelectric power generation device, mainly comprises a buoy-type energy capture system, a platform system and a mooring system. The buoy-type energy capture system mainly comprises buoys 18, guide rail rooms 15, pulley rooms 16, guide pulleys 14, fixed pulleys 17, platform pulleys 6 and wireropes 7. The platform system mainly comprises a hot water tank 12, a generator room 19 and a cooling room. The hot water tank 12 comprises a flywheel rotor shaft 1, rotary sleeves 2, preloaded springs 3, rings 4, a fixed bar 5, bearings 8, a heat collecting pipe 9, a thermal insulation layer 11, a flywheel 13, pawls 28 and inner ratchets 29. The generator room 19 comprises a cable 10, at least one turbogenerator 20 and a working fluid pump 21. The cooling room comprises a cooling pipe 24 and a water permeable net 25. The mooring system comprises mooring points 23, mooring lines 26 and anchors 27.

During working, the buoys 18 move downwards and drive the rotary sleeves 2 through the wireropes 7 to rotate counterclockwise, the inner ratchets 29 also rotate counterclockwise to drive the pawls 28 to rotate, and the flywheel rotor shaft 1 connected to the pawls 28 rotate accordingly. When the buoys 18 move upwards, the pawls 28 cannot be driven by the inner ratchets 29, so no energy is input to the flywheel 13. The rotating flywheel 13 and the liquid in the hot water tank 12 generate heat by friction, and the heat is protected by the thermal insulation layer 11. The part of the heat collecting pipe 9 extending into the hot water tank 12 is in direct contact with the hot liquid so that the liquid working fluid in the pipe is converted to the gaseous state. The gas working fluid drives each of the at least one turbogenerator 20 to generate power when passing, and the current is transmitted to the external equipment of the platform 22 through the cable 10. After entering the cooling pipe 24, the gas working fluid conducts heat exchange with the cold sea water outside the pipe, and is liquefied and brought back to the heat collecting pipe 9 by the working fluid pump 21.

The product design of the present invention should fully consider the following factors:

(1) The sizes of the platform and the buoys are designed according to the wave characteristics of different sea areas, the resonant frequency of the buoys is kept the same as the main frequency of the local waves as possible, and the resonant frequency of the platform is kept different from the main frequency of the local waves, the maximum motion amplitude of the buoys relative to the platform is ensured.

(2) The working fluid in the heat collecting pipe and the cooling pipe and the depth of the cooling pipe shall be selected according to the specific temperature parameters of the sea area where the device is used to ensure that the working fluid can quickly boil and evaporate into gas in the hot water tank, and can be completely converted to liquid after passing through the cooling pipe.

(3) The liquid in the hot water tank is selected according to actual conditions to ensure large specific heat capacity and high boiling point.

The construction and installation processes of the wave energy thermal storage type seawater thermoelectric power generation device are as follows:

(1) Constructing heat collecting pipe and cooling pipe modules for subsequent assembly. (2) Constructing the platform (without roofing), and building hot water tank, thermal insulation layer and generator room modules. (3) Constructing the remaining components such as pulleys, rotary sleeves and buoys. (4) Placing all the modules except the heat collecting pipe and the cooling pipe in sequence in the predetermined positions on the platform with the hoisting technology, leaving the leading-out location of the cable, pre-filling a sufficient amount of liquid working fluid in the cooling pipe, and filling the hot water tank with liquid. (5) Dragging the platform to the predetermined sea area and fixing with a mooring system. (6) Correctly placing the heat collecting pipe and the cooling pipe with the offshore hoisting technology, and finally roofing the platform. (7) Placing the platform pulleys, buoys and other components, and arranging and tightening the wireropes according to the solution of the present invention.

The specific parameters of an embodiment are as follows:

The sizes of the platform and buoys and the material of the main body need to be selected according to the actual sea state so that the wave frequency in the set sea state is close to the natural frequency of the buoys but away from the natural frequency of the platform.

With the South China Sea with the dominant wavelength of 6 in as an example, the diameter of the buoys can be set to 2 in, the height can be set to 3 in, and a total of 12 buoys uniformly surround the platform. For the platform, the diameter is set to 13 in, and the height is set to 6 in; and for the flywheel, the diameter is set to 8 in, and the thickness is set to 1 in. The diameter of the hot water tank is 12 in, the height is 2.6 in, the size of the generator room is the same as that of the hot water tank, and the thickness of the thermal insulation layer is 0.25 in. The diameter of the flywheel rotor shaft is 0.5 in, and the diameters of the heat collecting pipe and the cooling pipe are both 0.2 in. The diameter of the fixed bar is 0.15 in.

The surface of the flywheel is made of a rough sandy material, the surfaces of the wireropes, the water permeable net, the platform and the buoys are anti-corrosion and antifouling claddings, and the mesh diameter of the water permeable net is 1 mm, which can block most of marine organisms while allowing sea water to flow freely. The heat collecting pipe in the hot water tank and the cooling pipe in the cooling room are both copper tubes. According to the existing data of the sea state, pressurized liquid ammonia can be selected as the working fluid in the pipes, and water can be selected as the liquid in the hot water tank.

The invention claimed is:

1. A wave energy thermal storage type seawater thermoelectric power generation device, comprising:
a buoy-type energy capture system, a platform system and a mooring system; the platform system comprises three parts which are respectively a hot water tank, a generator room and a cooling room from top to bottom, wherein the hot water tank is wrapped with a thermal insulation layer and filled with liquid required for heating;
a flywheel rotor shaft is arranged in the center of the hot water tank, the lower part of the flywheel rotor shaft is in contact with the bottom surface of the hot water tank, a flywheel is fixed by bearings in the middle of the flywheel rotor shaft, and the upper part extends out of the hot water tank and above the platform the flywheel rotor shaft is fixed by bearings on faying surfaces; the flywheel rotor shaft above the platform is sheathed with a plurality of rotary sleeves, each rotary sleeve has an inner ratchet and a pawl inside, the inner ratchet is fixedly connected to the inner wall of the rotary sleeve, and is not in contact with the flywheel rotor shaft, the pawl is fixed on a disc fixedly connected to the flywheel rotor shaft, and a needle roller bearing is arranged between the disc and the inner wall of the rotary sleeve;
a wire-rope is wound around the outer wall of the rotary sleeve, one end of the wire-rope is connected to the buoy-type energy capture system, and the other end is connected to a preloaded spring which is connected to a fixed bar through a ring, a heat collecting pipe is wound around the inner wall of the hot water tank, and has gas working fluid inside; the left and right ends of the heat collecting pipe extend upwards away from the hot water tank and the upper surface of the thermal insulation layer, and then extend downwards along the outer wall of the thermal insulation layer into the generator room,
wherein the generator room comprises at least one turbogenerator and a working fluid pump, and the turbogenerator has a cable extending above the platform for connection with other electrical equipment; both ends of the heat collecting pipe respectively pass through each of the at least one turbo-generators in the generator room, and continue to extend downwards, and finally communicate with a cooling pipe in the sea, the main body of the cooling pipe is a spiral descent pipe with liquid working fluid inside;
a water permeable net connected to the bottom surface of the platform covers outside of the whole cooling pipe, and the water permeable net and the cooling pipe form the cooling room of the platform system;
wherein the mooring system comprises mooring points, mooring lines and anchors, wherein the mooring points are at the bottoms of both sides of the platform, and the mooring lines are connected to the platform through the mooring points and fixed on the seabed with the aid of the anchors;

wherein the buoy-type energy capture system comprises two parts: buoys and motion transfer components, wherein the motion transfer components comprise guide rail rooms, pulley rooms, guide pulleys, fixed pulleys, platform pulleys and wire-ropes, a plurality of buoys uniformly surround the platform, one side of each buoy close to the platform is connected to the guide rail room through the guide pulleys, the pulley room is arranged between the guide rail room and the platform, and the pulley room has a pulley block composed of four fixed pulleys inside, and one end of the wire-rope is bound with the guide pulleys, and the other end starts from the guide rail room and passes the pulley block of the pulley room and the platform pulley fixed on the platform to be finally connected with the rotary sleeve;

during working, the buoys move up and down under the drive of waves and drive the wire-ropes to move; when the buoys move upwards, because the wire-ropes is bound with the guide pulleys, the wire-ropes of the guide rail rooms move upwards at the same time, and the wire-ropes located in the pulley rooms change from moving upwards to moving downwards due to the action of the fixed pulleys; under the action of the platform pulleys, the wire-ropes above the platform moves horizontally towards the left to drive the rotary sleeves to rotate clockwise; at this time, the preloaded springs are stretched, and part of the wave energy is converted to elastic potential energy;

wherein the inner ratchets rotate together with the rotary sleeves but cannot drive the flywheel rotor shafts to rotate due to the action of the pawls, when the buoys move downwards, the wire-ropes are wound back to the rotary sleeves counterclockwise in the tightened state due to the action of the preloaded springs; at this time, thus, the pawls no longer hinder the rotation of the flywheel rotor shafts, and consequently the flywheel rotates under stress;

wherein the rotating flywheel constantly rubs against the liquid filled in the hot water tank to heat the liquid, thereby achieving wave energy thermal storage, the thermal insulation layer ensures to maximize prevention of the hot water tank from conducting heat exchange with the outside;

further direct contact between the heat collecting pipe and the hot liquid, the heat generated by the friction between the flywheel and the liquid can be transferred into the heat collecting pipe with high efficiency, a liquid working fluid in the heat collecting pipe immediately boils and evaporates into gas, and the volume expands rapidly; since liquid continuously enters on the side with the working fluid pump, the gas moves quickly to each of the at least one turbo-generator; the high-speed gas working fluid drives each of the at least one turbo-generators to generate power, and current is transmitted to other electrical equipment through the cable; after entering the cooling pipe, the gas working fluid is condensed into liquid at seawater temperature; and the liquid working fluid is pumped back to the heat collecting pipe by the working fluid pump, and converted to gas by heat for cycle of power generation.

2. The wave energy thermal storage type seawater thermoelectric power generation device according to claim 1, wherein the outer wall of the heat collecting pipe is covered with the thermal insulation layer to keep the temperature in the heat collecting pipe practically constant.

3. The wave energy thermal storage type seawater thermoelectric power generation device according to claim 1, wherein the pipe walls of the heat collecting pipe and the cooling pipe are made of metal for fast heat transfer.

4. The wave energy thermal storage type seawater thermoelectric power generation device according to claim 1, wherein the surfaces of the platform, the buoys, the wireropes and the water permeable net are all treated to extend the service life thereof.

5. The wave energy thermal storage type seawater thermoelectric power generation device according to claim 3, wherein the surfaces of the platform, the buoys, the wireropes and the water permeable net are all treated to extend the service life thereof.

6. The wave energy thermal storage type seawater thermoelectric power generation device according to claim 1, wherein the outer surface of the flywheel is made of a rough sandy material to improve the efficiency of heat generation by friction.

7. The wave energy thermal storage type seawater thermoelectric power generation device according to claim 3, wherein the outer surface of the flywheel is made of a rough sandy material to improve the efficiency of heat generation by friction.

8. The wave energy thermal storage type seawater thermoelectric power generation device according to claim 4, wherein the outer surface of the flywheel is made of a rough sandy material to improve the efficiency of heat generation by friction.

* * * * *